US012681959B2

(12) United States Patent
Bachann

(10) Patent No.: US 12,681,959 B2
(45) Date of Patent: Jul. 14, 2026

(54) DATABASE ACCESS SYSTEM USING MACHINE LEARNING-BASED RELATIONSHIP ASSOCIATION

(71) Applicant: C3S, Inc., Jacksonville Beach, FL (US)

(72) Inventor: Mintu Bachann, Jacksonville Beach, FL (US)

(73) Assignee: C3S, Inc., Jacksonville Beach, FL (US)

( * ) Notice: Subject to any disclaimer, the term of this patent is extended or adjusted under 35 U.S.C. 154(b) by 997 days.

(21) Appl. No.: 17/239,378

(22) Filed: Apr. 23, 2021

(65) Prior Publication Data

US 2022/0342914 A1 Oct. 27, 2022

(51) Int. Cl.
| | |
|---|---|
| *G06F 16/28* | (2019.01) |
| *G06F 16/248* | (2019.01) |
| *G06N 20/00* | (2019.01) |

(52) U.S. Cl.
CPC .......... *G06F 16/288* (2019.01); *G06F 16/248* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,108,665 | A * | 8/2000 | Bair ....................... | G16H 20/70 |
| 2010/0068687 | A1 | 3/2010 | Bertelsen | |
| 2010/0138370 | A1 | 6/2010 | Wu et al. | |
| 2010/0179930 | A1 | 7/2010 | Teller et al. | |

| | | | | |
|---|---|---|---|---|
| 2010/0235361 | A1 * | 9/2010 | Chandran ................ | G06N 5/01 |
| | | | | 706/46 |
| 2012/0084092 | A1 * | 4/2012 | Kozuch .................. | G16H 10/20 |
| | | | | 705/2 |
| 2017/0039325 | A1 * | 2/2017 | Dorsett .................. | H04L 51/02 |
| 2017/0124269 | A1 * | 5/2017 | McNair .................. | G16H 50/20 |
| 2017/0180809 | A1 | 6/2017 | An et al. | |
| 2018/0082183 | A1 | 3/2018 | Hertz et al. | |

(Continued)

OTHER PUBLICATIONS

Miyashita et al., "Personality data analysis processor and its method", 2002 (Year: 2002).*

(Continued)

*Primary Examiner* — Dawaune A Conyers

(74) *Attorney, Agent, or Firm* — FINNEGAN, HENDERSON, FARABOW, GARRETT & DUNNER, LLP

(57) ABSTRACT

A system includes a processor configured to perform operations. The operations include receiving responses to at least first and second questions from a user device over a network; and using a machine-learning algorithm to determine a relationship between the first and second questions based on the received responses; assign to the first and second questions, a relationship value between 0 and 1 based on the determined relationship, wherein the relationship value represents a likelihood the response to the first question is associated with the response to the second question; designate the first or second question as a critical question when a determined relationship value is greater than 0.5; and determine a need of the user based on the response of the user to the critical question. Operations further include generating and providing to the use device a list of service providers based on the determined need of the user.

17 Claims, 10 Drawing Sheets

100

(56) References Cited

U.S. PATENT DOCUMENTS

| | | | | |
|---|---|---|---|---|
| 2018/0189457 A1* | 7/2018 | Plummer | ............... | G16H 50/70 |
| 2020/0194125 A1* | 6/2020 | Adolphus | ............. | H04W 4/029 |
| 2020/0335183 A1* | 10/2020 | Tommasi | ............... | G06N 3/006 |
| 2022/0172841 A1* | 6/2022 | Steinberg-Koch | ..... | G16H 50/70 |
| 2023/0080929 A1* | 3/2023 | Lin | .................... | G06Q 30/0609 |
| | | | | 705/347 |
| 2023/0092866 A1* | 3/2023 | Vaughan | .................. | G06N 5/01 |
| | | | | 706/12 |

OTHER PUBLICATIONS

"Building Healthier Communities Together", Unite Us 2020, https://fusionlp.org/wp-content/uploads/2020/11/Unite-Us-Solutions-Brochure-3.pdf (last accessed Apr. 22, 2021).

Sarker. "Machine learning: Algorithms, real-world applications and research directions." SN Computer Science 2.3 (2021): 1-21. Mar. 22, 2021 (Mar. 22, 2021) Retrieved on Aug. 30, 2022 (Aug. 30, 2022) from <https://llnk.springer.com/article/10.1007/s42979-021-00592-x> entire document.

International Search Report and Written Opinion for International Application PCT/US2022/025683, mailed Oct. 5, 2022 (11 pages).

* cited by examiner

200

202
Demographic information
● age
● race/ethnicity
● geography (zip code)
● preferred service provider radius 204
Household dynamic
● neglect
● abuse
● dysfunction 206
Socio-Economic
● self/family income level
● highest level of education 208
Health Information
● self-rated
● current healthcare providers
● check off conditions that apply

500

502 — register/submit service provider request

504 — receive request

506 — transmit questionnaire

508 — fill out/submit questionnaire

510 — receive questionnaire

512 — execute machine learning algorithm

514 — determine customer need

516 — generate service provider list

518 — submit list to customer

520 — submit responses and needs to provider

522 — store responses and needs

600

602 — register

604 — receive request

606 — transmit questionnaire

608 — fill out/submit questionnaire

610 — receive questionnaire

612 — store information

702

Entity Information
- type of entity
- services provided
- geography (zip code)

704

Practitioner/Staff information
- educational background
- years of service
- specialties

706

Limitations
- availability
- insurance required

700

<u>800</u>

810 — Receive previously submitted customer responses

820 — Extract machine learning features

830 — Determine customer response patterns

DATABASE ACCESS SYSTEM USING MACHINE LEARNING-BASED RELATIONSHIP ASSOCIATION

TECHNICAL FIELD

The present disclosure generally relates to the field of customer service platforms. More specifically, and without limitation, this disclosure relates to systems and methods for database access using machine learning-based relationship association to generate service provider information.

BACKGROUND

There is a need in the social services industry to improve upon community access to health, education, and social programs. The need for such access is especially important for low-income and other "high risk" groups who may not have access to healthcare and educational resources. Despite the need, current community outreach and social servicing platforms suffer from various drawbacks, such as service fragmentation and geographic isolation, which prevent them from fulfilling the demand. These platforms fail to accurately determine their customer's needs because they provide superficial and inadequate assessment analysis of needs and limited access to customer information.

The systems and methods described herein address at least some of the drawbacks of traditional social service platforms by simplifying and optimizing the customer need assessment process by using machine learning-based relationship associations to generate service provider recommendations. Such systems and methods may allow service providers to more accurately service the customers based on their particular needs.

SUMMARY

The present disclosure provides methods and systems for efficiently determining customer needs using machine learning-based relationship associations to access databases and generate service provider recommendations.

A first aspect of the disclosure provides a system for using machine learning-based relationship association to assess a user need, the system may include at least one processor; and a storage medium storing instructions that, when executed, configure the at least one processor to perform operations. The operations may include receiving from a user device one of an electronic service request or registration request; transmitting to the user device for display on a user interface, over a communication network, a questionnaire with at least a first and second question in response to the request of the user; receiving responses to the first and second questions from the user device over the network; determining, using a machine-learning algorithm, a relationship between the first and second questions based on the received responses; assigning to the first and second questions, using the machine-learning algorithm, a relationship value between 0 and 1 based on the determined relationship, wherein the relationship value represents a likelihood the response to the first question is associated with the response to the second question; determining, using the machine-learning algorithm, whether the first or second question has a relationship value greater than 0.5; designating, using the machine-learning algorithm, the first or second question as a critical question when the relationship value is greater than 0.5; determining, using the machine-learning algorithm, a need of the user based on the response of the user to the critical question; accessing a database to generate a list of service providers based on the determined need of the user; and providing the list of service providers to the user device for display on the user interface.

Another aspect of the disclosure provides a computer-implemented method for generating a list including at least one service provider. The method may include receiving from a user on a user device, one of an electronic service request or registration request; transmitting to the user, over a network, a questionnaire; receiving responses to the questionnaire from the user device over the network; and executing an algorithm to assign the user to one or more clusters, wherein each of the clusters is defined by a data set of previously obtained responses corresponding to a particular character trait. The algorithm may compare the user's responses to the previously obtained responses; determine the frequency with which the user's responses overlap with the previously obtained responses; assign the user to the cluster having the greatest frequency of overlap; generate a list including at least one service provider based on the assigned cluster; transmit the generated list including at least one service provider to the user device over the network; and cause the generated list to be displayed to the user on the user device.

Yet another aspect of the disclosure provides a method including storing a list of service providers and clusters of community demographic information in one or more network-based non-transitory storage devices; receiving, over a network, user identifying information from a user device; storing the user identifying information in a standardized format in the one or more non-transitory storage devices; analyzing the user identifying information to match the user to at least one of the clusters; assessing one or more user risk factors based on the at least one of the cluster to which the user is matched; automatically generating a customized list of service providers based on the assessed one or more user risk factors, wherein the customized list is based on the user's assessed risk factors and the customized list is narrower than the stored list of service providers; and transmitting the customized list of service providers to the user device.

It is to be understood that the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this disclosure, illustrate various disclosed embodiments and, together with the description, serve to explain the disclosed principles. In the drawings.

DETAILED DESCRIPTION

Figure 1:
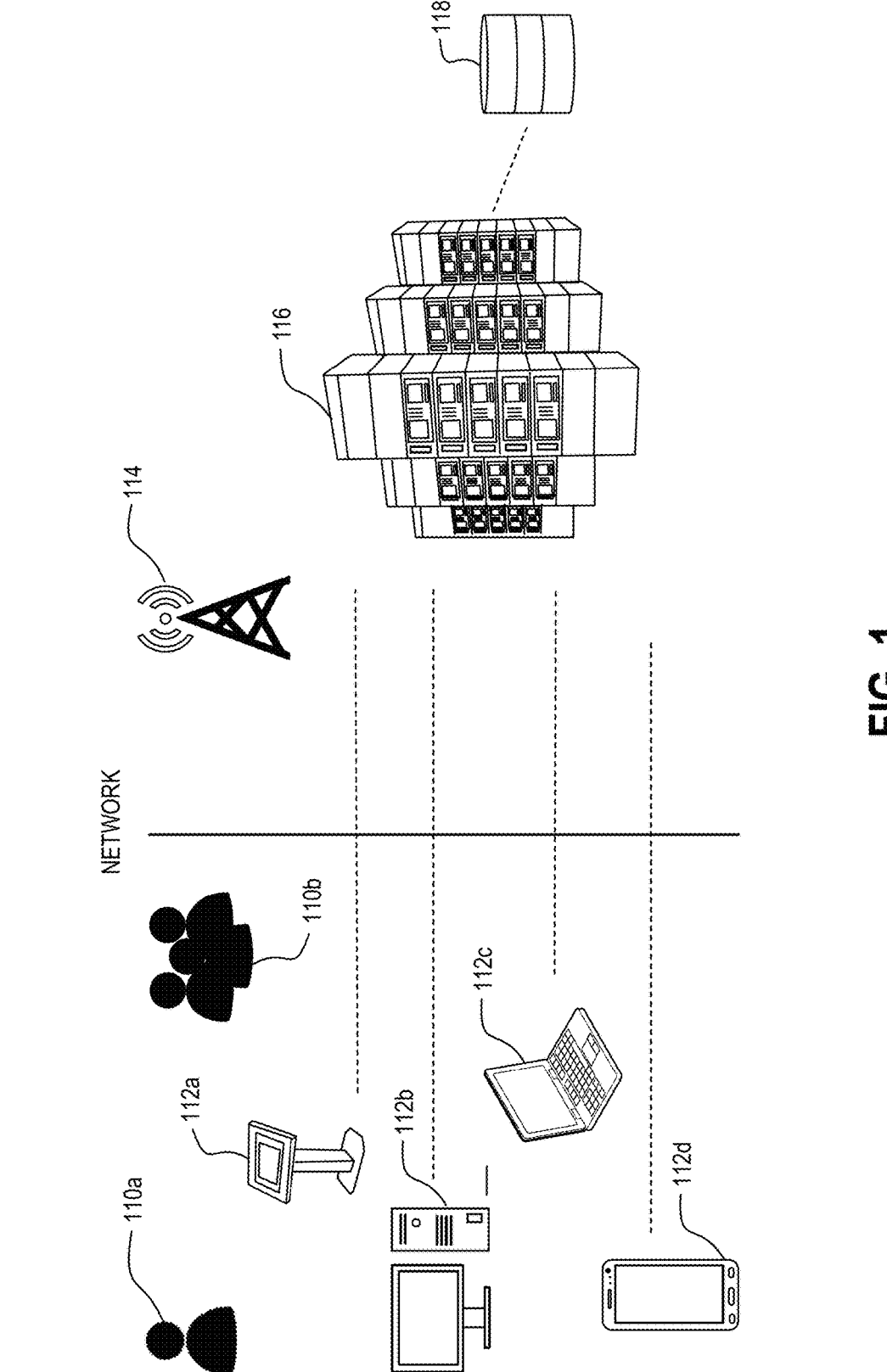
FIG. 1 is schematic illustrating an exemplary system in accordance with embodiments of this disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Some embodiments of this disclosure may involve systems and methods for assessing a customer's medical or behavioral health needs. Although embodiments of the current disclosure may be used to determine other needs. As used herein, a "customer" is any individual, group of individuals, business, or entity. For example, the customer may be a minor, adult, or an actor, e.g. a caregiver, parent, guardian, spouse, boss, social worker, physician etc., acting on behalf or in a representative capacity of another minor or adult. The customer may also be an entity, e.g., a hospital, treatment center, school, youth organization, place of worship, etc., acting on behalf or in representative capacity of one or more members of the entity. The term "need" as used herein, means any tangible or intangible good or service, that if met would improve the customer's health, behavioral, financial, environmental, educational, or socio-economic disposition. For example, the systems and methods disclosed herein may determine that a customer, such as a child, has a need for food or school materials (a tangible good) and therapy (intangible service). The term "customer" may be used interchangeably with the term "user".

The embodiments disclosed herein may include a computing device. As used herein, a "computing device" is any computer, distributed computing system, server, or network of servers capable of receiving, processing, and transmitting data over a network, such as the internet. The computing device may include one or more processors, memory having executable instructions, and storage, as are known in the art. The computing device may be configured to receive an electronic service request from the customer. The service request may be an inquiry for a particular type of service provider e.g., a physician or therapist, or a request for a service provider recommendation based on a need. In the latter scenario, the customer might, for example, notice concerning behavior or signs of trauma, e.g., that a student is "acting out" or exhibiting signs of emotional trauma, and request a service provider recommendation to address the underlying cause of the behavior or trauma. The server may also be configured to receive an electronic customer registration request, whereby the customer requests to sign-up for the services disclosed herein. The requests may be received from the customer over a network.

In accordance with some embodiments, the customer may submit the request from a remote location using a customer device, e.g., a desktop, laptop, mobile phone, kiosk, personal digital assistant, tablet, smart TV, or other network-enabled device. The term "customer device" as used herein refers to a device used by the customer, and is not meant to be limiting regarding ownership of such a device. The term "customer device" may be used interchangeably with the term "user device". Both the customer device and computing device are connected to a network, such as the internet, cellular network, local area network (LAN), metropolitan area network (MAN) or wireless area network (WAN), thus allowing communications to be transmitted between the computing device and the customer device. The customer device may include a downloaded or installed application that directs the customer to a user interface when the customer opens the application. The customer may submit the request using the interface. In some embodiments, the customer may lunch a web browser and access the user interface by inputting a web address corresponding to the customer service platform in the web browser. In some embodiments the customer may receive a link via e.g., email or text message, that directs the user to the interface when clicked. The interface may be a graphical user interface including a plurality of selectable options.

Upon receiving a request from the user, the computing device may transmit an electronic questionnaire to the user over the network. FIG. 1 illustrates an exemplary system in accordance with this disclosure. A customer, e.g. individual 110*a* or entity 110*b* may use a network enabled customer device 112*a-d* to submit a registration request to the service platform. The registration request may be submitted over a network, such as a cellular network 114, to one or more servers operating as computing device 116. Upon receiving the request, computing device 116 may send a questionnaire over network 114 to the user 110*a*/110*b* for completion. The user 110*a*/110*b* may complete all or a portion of the questionnaire and submit the responses to the computing device 116 over the network 114 using the network-enabled device 112*a-d*. Computing device 116 may process the responses and store them in one or more databases 118 as discussed below.

The questionnaire may include a variety of questions intended to solicit information about the customer's identification and needs. For example, some questions may inquire as to the customer's name, address, date of birth, and other demographic information, while other questions may be tailored to assess a particular need. For example, health-related questions may inquire as to a customer's health history (e.g. chronic conditions, height, weight, allergies, surgeries or other procedures, medications, or other health indicative information), whether and how often the customer sees a physician (PCP, ophthalmologist, dentist, or other medical specialist). Socio-economic related questions may inquire as to the customer's employment status, income, family size, educational background, whether the customer ever received social welfare services, whether the customer was ever arrested, convicted of a crime, or imprisoned, or other questions indicative of the customer's socio-economic status. Behavioral-related questions may inquire as to whether the customer was ever arrested, convicted of a crime, imprisoned, abused, abandoned, used or exposed to drugs and alcohol, whether the customer would describe his/her upbring as nurturing or violent, or other questions that may be determinative of emotional or physical trauma.

If the customer is a business or other entity, the questionnaire may ask the customer if it would like to provide services to other customers associated with the platform. For example, the questionnaire may ask a pediatrician completing the questionnaire on behalf of a patient whether the pediatrician would like his services and/or practice to be added to the platform's network of healthcare providers. If the provider agrees to be listed, the computing device may store the provider's demographic information in a database. In this way, the platform may compile a database of confirmed platform affiliates, that may be recommended to other customers, as will be discussed in further detail below.

In some embodiments the system is adaptive such that the questionnaire automatically generates questions based on responses to previous questions. For example, if a customer responds that he or the person on whose behalf he is completing the questionnaire is 10 years of age, the questionnaire may not present questions related to employment history and income, but may present questions related to school attendance, school grades, and school disciplinary history. The questions may solicit a binary response, e.g. "yes" or "no". In other embodiments the questions may be multiple choice, and offer a variety of responses, e.g., "yes", "sometimes yes", "never", "likely", "unlikely", "somewhat likely" or "somewhat unlikely." In some embodiments, the questions may solicit a response in the form of a numerical range, e.g., 1-10, or be open-ended, so that the customer can provide a narrative response. The questionnaire may include any combination of question types and at least two questions.

Figure 2:
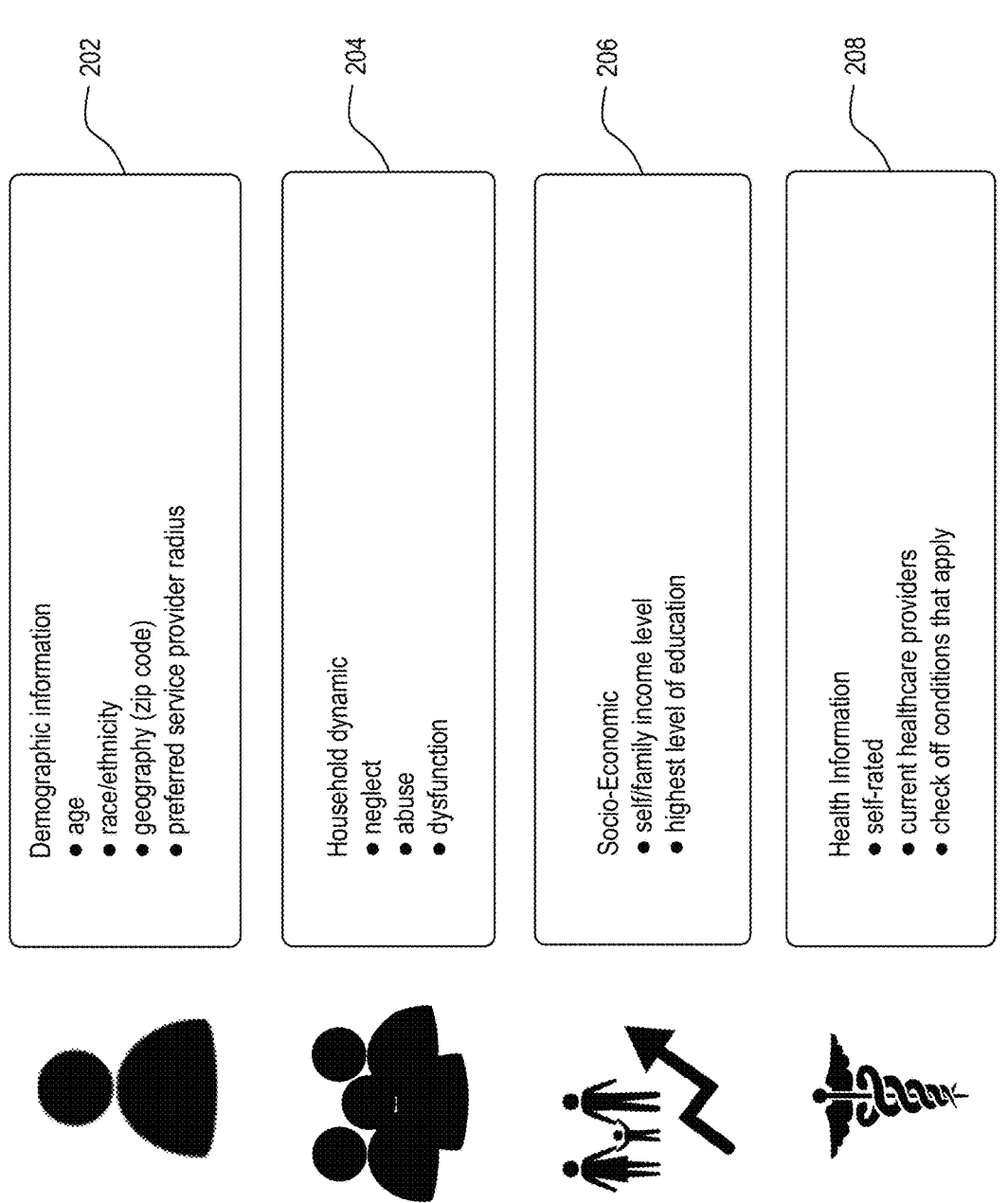
FIG. 2 is an illustration of an exemplary questionnaire in accordance with embodiments of this disclosure.

FIG. 2 illustrates an exemplary questionnaire in accordance with embodiments of this disclosure. Questionnaire 200 may include subsections 202-208, each of which focuses on a particular category. For example, subsection 202 may prompt the customer for demographic information such as age, race/ethnicity, zip code, and a preferred service provider radius. The preferred service provider radius may be used to narrow the list of service providers so that they are situated within the prescribed radius. In some embodiments, the system may use geolocation to ascertain the customer's location and automatically narrow the list of service providers based on a preferred radius. For example, the system may determine the customer's location using GPS, network triangulation, Wi-Fi positioning, Bluetooth, the customer device's IP address (and other device identifiers), or other methods known or considered obvious to one of ordinary skill in the art.

Subsection 204 may prompt the user for information relating to the customer's household dynamic. For example, subsection 204 may ask whether the customer has ever been physically or emotionally neglected, abused (e.g., bodily, psychological and or sexual abuse), and/or the nature of any household dysfunction (e.g., whether members of the household, including the user suffer from substance/alcohol abuse or violence). If the customer is a minor, the questionnaire may further inquire as to whether the minor's parents are separated. Subsection 206 may prompt the customer for socio-economic information. For example, subsection 206 may inquire as to the customer's income level and education. The income level may be reported in quantitative terms, e.g., household salary or in subjective terms, e.g., "below average", "average", or "above average." If the customer is a minor, subsection 206 may inquire as to the highest education level of the customer's parents. Subsection 208 may inquire as to the customer's health information. For example, subsection 208 may prompt the user to rate their overall health (e.g., "below average", "average", or "above average"), to provide a list of current healthcare providers (e.g., PCP, dentist, ophthalmologist, cardiologist, etc.), and to check off any health conditions (e.g., migraines, diabetes, hypertension, glaucoma, heart disease, cancer) that might apply. The customer may also be prompted to provide basic health statistics, e.g., weight and height.

Although multiple subsections are illustrated, one of skill in the art will appreciate that a single subsection or grouping of subsections may be presented to the user. In accordance with some embodiments, the questionnaire may be customized to meet the needs of a particular entity. For example, an entity such a behavioral health specialist may upload a preferred questionnaire into the platform. The platform may standardize the form to ensure that the response format is compatible with the machine-learning algorithms discussed below. For example, the platform may configure the questions so that all responses are submitted in a "true/false" format. In some embodiments, the system automatically customizes the questions based on the system's analysis of the customer's responses to previously answered questions. The questions may get smarter with each question answered thereby streamlining the questionnaire process. In some embodiments, the system customizes or adapts subsequent questions provided in the questionnaire in real-time, based on the system's analysis of the customer's responses to previously answered questions. For example, based on the customer's answers to the first three questions, the system may generate the next three questions in real-time.

Upon responding to the questionnaire, the customer may submit the responses to the computing device for processing. In some embodiments, the user may submit the response by selecting "send" or "submit" on the platform website or application. Although it is preferable for the user to complete the questionnaire prior to submitting, completion is not necessary for submission or processing.

The computing device 116 may be configured to process the responses when received. In accordance with some embodiments, the processor may execute a machine learning algorithm on the responses to extract associations and determine a relationship between at least two of the questions based on the user's response. The algorithm may be a supervised learning algorithm such as Naïve Bayes, K-Nearest Neighbors (KNN), or other classification algorithm configured to predict a categorical outcome based on a given sample. The algorithm may also include a Calculation and Regression Tree (CART), Linear Regression, Logistic regression, or other regression algorithm configured to predict a quantitative outcome of a given sample.

Figure 3:
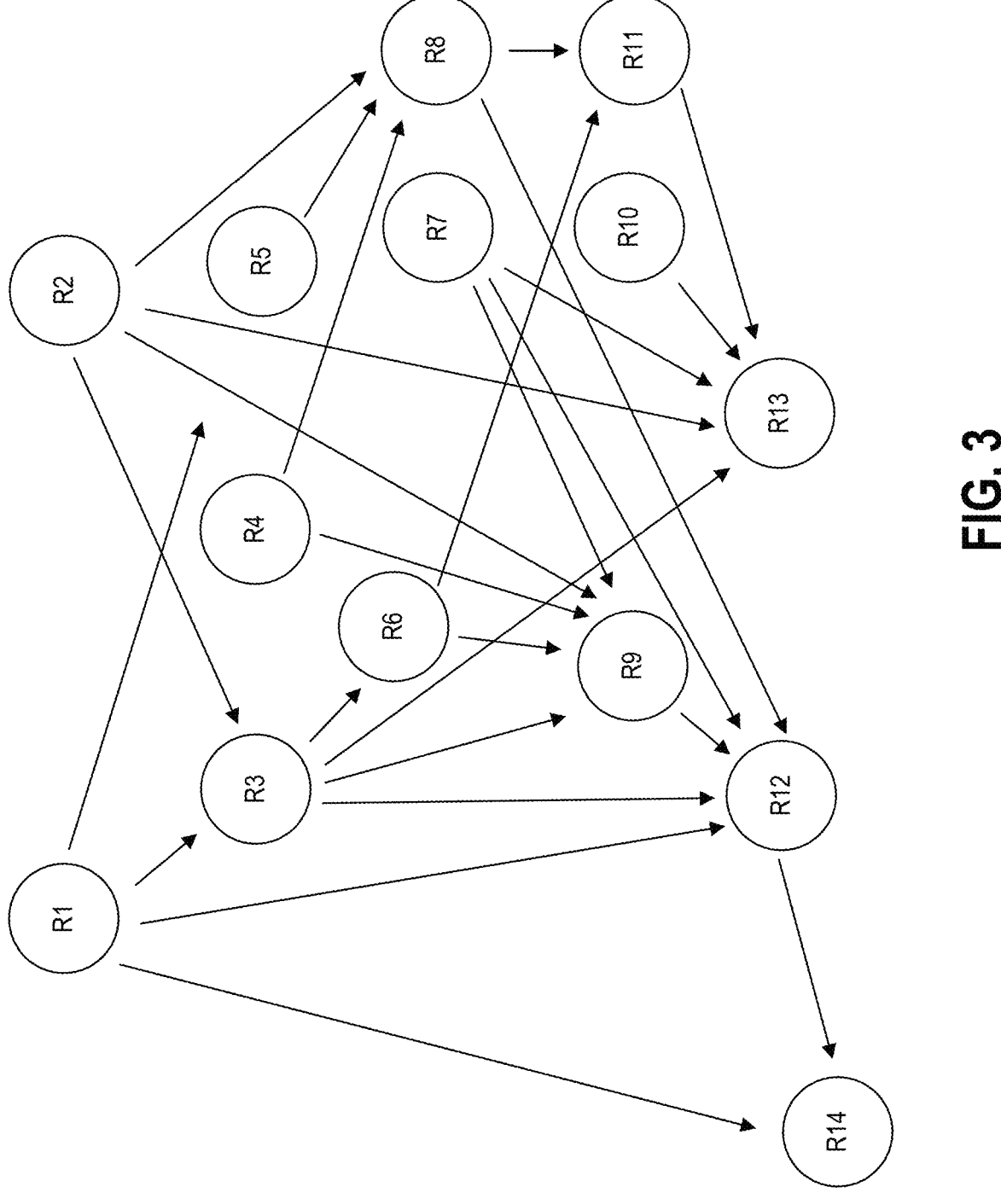
FIG. 3 is a diagram illustrating an exemplary application of a machine learning algorithm in accordance with embodiments of this disclosure.

For example, a Naïve Bayes algorithm may be executed on a set of customer questions and responses to determine how a response to one question relates to a response to another question. Relationships may be assessed for all questions $Q_1$ through $Q_n$ and responses $R_1$ through $R_n$ in an iterative style to determine the relationship between any one question/response and any or all other questions and responses to generate a relationship map whereby a customer's response to one question is predictive of how that customer will respond to another question. FIG. 3 is an exemplary graphical representation of a relationship map.

Regarding FIG. 3, R1-R14 represent customer responses to questions Q1-Q14. $R_2$ is an affirmative response that is predictive of affirmative responses $R_3$, $R_8$, $R_9$ and $R_{13}$. Because $R_2$ is highly predictive, the question it corresponds to is useful for determining how a customer might answer other questions. This predictive relationship may be assigned a quantitative value between 0 and 1. The closer the value is to 1, the more predictive the question. In accordance with embodiments of this disclosure, the algorithm may designate questions having a relationship value greater than 0.5 as critical questions because of their predictive potential. Other values, e.g., 0.6, 0.7, 0.8 and 0.9 (or values therebetween) may be used as the critical value threshold. The algorithm may then determine one or more customer needs based on the customer's responses to critical questions.

In some embodiments, the processor may be configured to execute multiple machine learning algorithms. For example a Naïve Bayes algorithm may be executed on the responses to predict a customer need and a Linear Regression algorithm may be executed to determine a probability that the customer will benefit if the need is addressed by a service provider. In some embodiments an unsupervised algorithm may be executed on the responses in addition to one or more supervised learning algorithms to determine relationships between the customers. The unsupervised algorithms may include, for example, Apriori, K-means, PCA or other association, clustering, or dimensionality reduction algorithms. For example, a clustering algorithm, such as K-means may be executed on a data set of customer responses to group customers having similar response patterns into clusters. The Naïve-Bayes algorithm may then be executed to predict the need of a customer based on the cluster to which the customer is assigned. Exemplary embodiments illustrating an application of the algorithm will be discussed in further detail below.

Upon determining one or more customer needs, the computing device may match the customer to a service provider suitable to addressing the need. The service provider may be selected from a publicly available directory of confirmed platform affiliates, as discussed above. In some embodiments, restrictions may be placed upon the matched service provider. For example, a geographic restriction may be used so that the recommended provider is located within, for example, 5 miles of the customer's home address or determined device location. The processor may be further configured to generate a list of the critical questions and store them in the computing device's database. The critical questions may be categorized by question type. For example, critical questions may be critical behavioral questions, critical health questions, critical financial questions, etc. In some embodiments, the generated list may be transmitted to the recommended service provider so that the service provider knows which questions to discuss with the customer.

Embodiments disclosed herein may use a computer-implemented method to generate a list including at least one service provider. The service provider may be a confirmed platform affiliate or selected from a public directory as discussed above.

An electronic service request or registration request may be submitted over a network to the service platform from a user on a customer device. The device may include a desktop, laptop, mobile phone, kiosk personal digital assistant, tablet, smart TV, or other network-enabled device, as discussed above. A questionnaire may be transmitted, in response to the request, to the customer device over the network. The questionnaire may be transmitted from a computing device as discussed above. In accordance with some embodiments, the questionnaire may be downloaded on the customer device and uploaded to the platform upon completion. In some embodiments, the questionnaire may be completed through an application operating on the customer device. In some embodiments, the questionnaire may be completed through the platform's website, which is accessible through a web browser on the customer device. The customer may respond to and submit the questionnaire over the network to the computing device.

The computing device may be configured to store each of the responses in a database with other previously obtained customer responses for further processing. In this way, the computing device may analyze each set of customer responses by, e.g., comparing the response of one customer against all sets of previously obtained customer responses. In accordance with some embodiments, the computing device may execute a machine-learning algorithm to analyze the responses to determine a relationship between one set of customer responses and one or more other sets of customer responses in the database. The machine learning algorithm may compare the customer's responses to the previously obtained responses and determine the frequency with which the customer's responses overlap with the previously obtained responses. In accordance with some embodiments of the disclosure, the algorithm is a clustering algorithm, such as a K-means, hierarchal clustering, mean-shift clustering, Density-Based Spatial Clustering of Applications with Noise (DBSCAN), Expectation-Maximization (EM) Clustering, or other clustering algorithm as would occur to one having ordinary skill in the art.

Figure 4A:
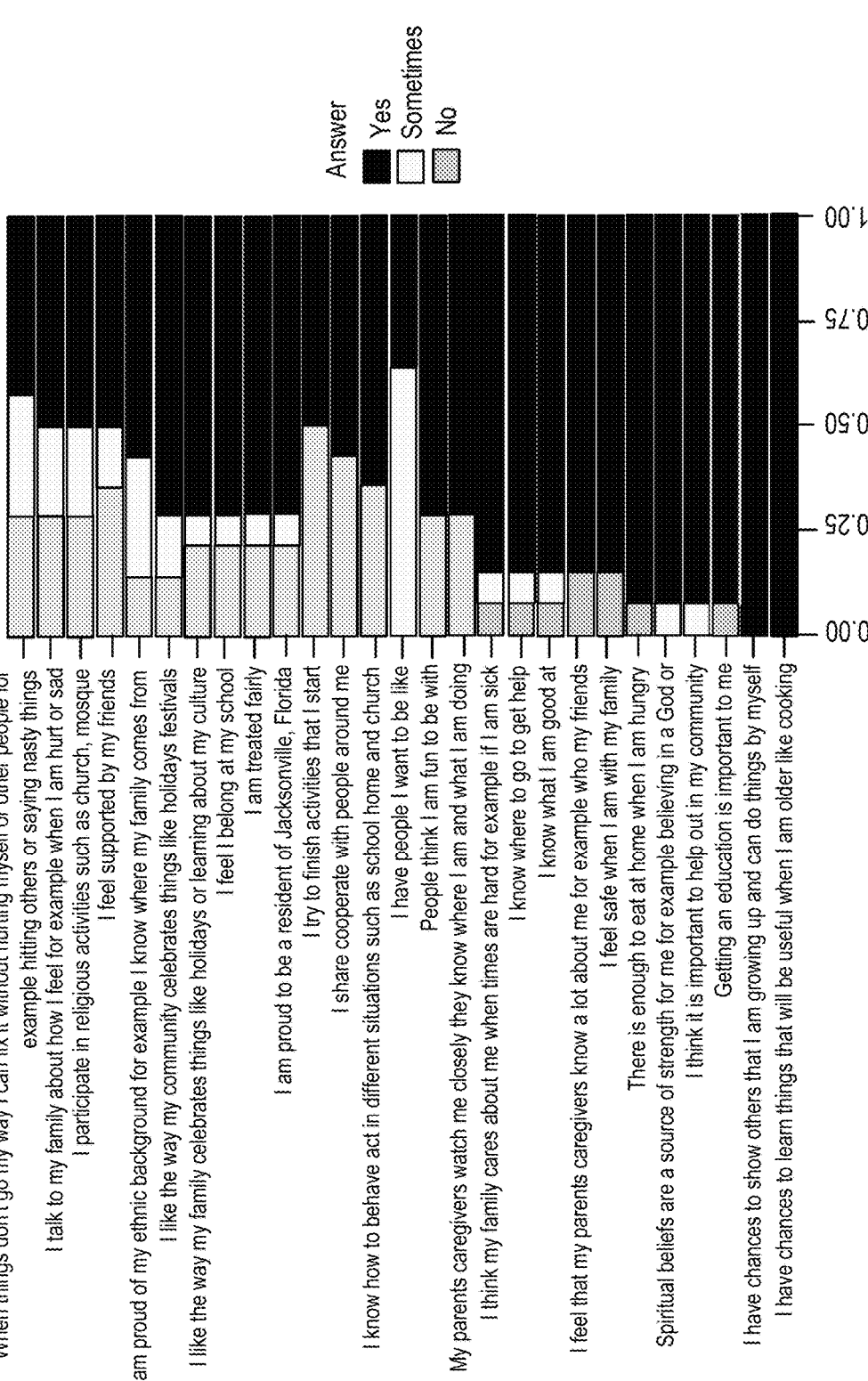
FIG. 4A is an illustration of an exemplary dataset in accordance with embodiments of this disclosure.
Figure 4B:
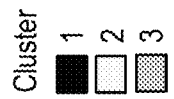
FIG. 4B is a graph illustrating an exemplary output of a clustering algorithm in accordance with embodiments of this disclosure.
Figure 4C:
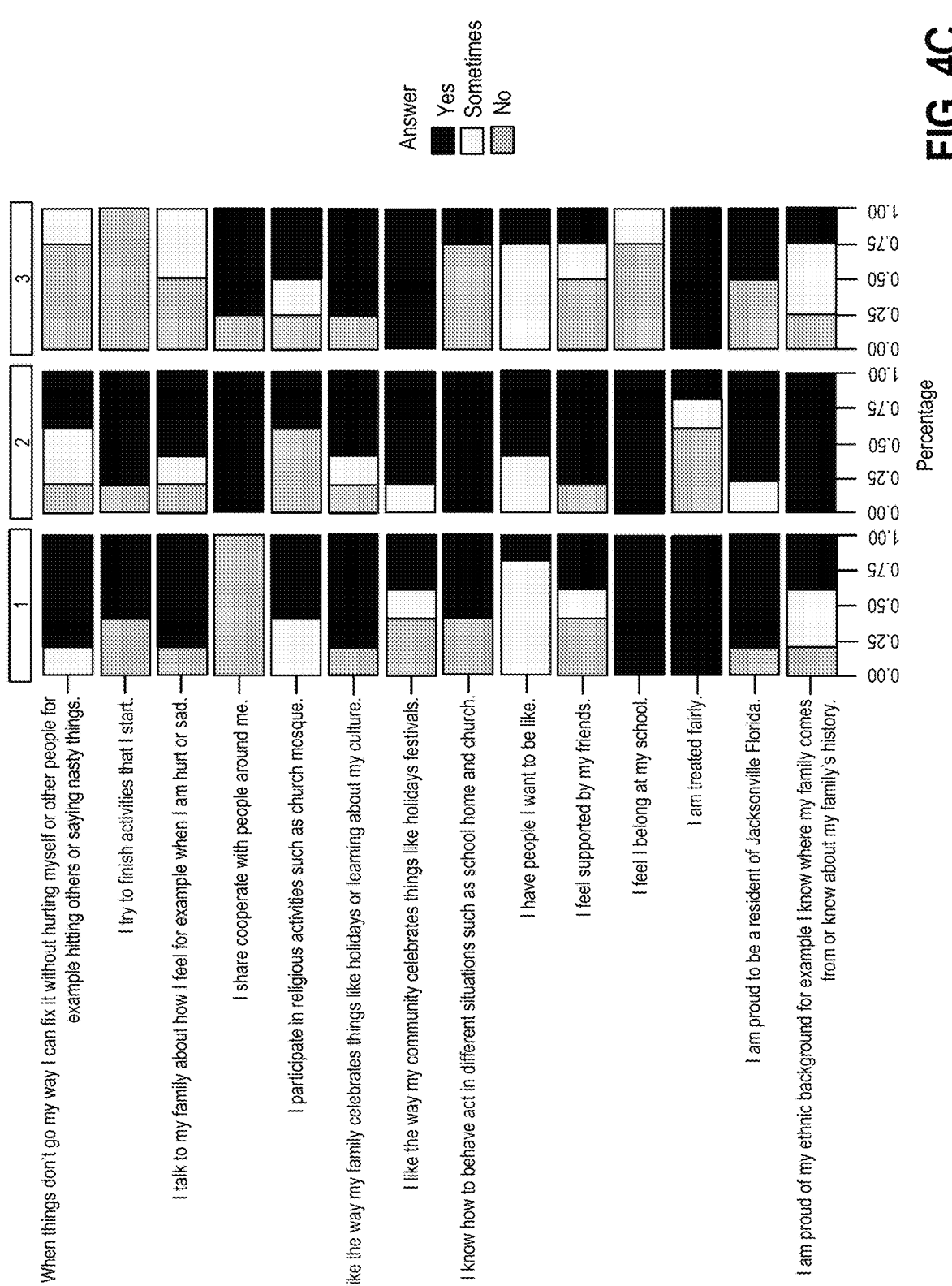
FIG. 4C is a graph illustrating an exemplary output of a clustering algorithm in accordance with embodiments of this disclosure.

FIG. 4A is an exemplary chart illustrating the frequency of customer responses within a database customer responses. For each question presented, the customer had the option to respond "yes" depicted in black, "sometimes" depicted in light grey or "no" depicted in dark grey. The frequency of each response is measured across all customers (i.e., how often all customers respond "yes" to a question) and conveyed as a percentage. The machine-learning algorithm may determine, based on the response and comparison, that the customer shares certain traits with other customers, and assign the customer to a cluster corresponding to the greatest frequency of overlap. FIG. 4B illustrates an output of the clustering algorithm in which each customer is assigned to one of three clusters based on the responses received. For example, Child 6, Child 9, and Child 11 are assigned to Cluster 3. FIG. 4C illustrates another output of the clustering algorithm, wherein for each cluster 1-3, the question posed, and frequency of "yes", "sometime" and "no" responses is provided.

The cluster may have an identifier describing a particular trait. The trait may be related to health, behavior, or another category. For example, if the questionnaire relates to a behavior assessment, the identifiers may describe behavioral traits. Customers whose responses overlap may then be assigned to clusters associated with the particular behavioral trait.

A behavioral application will now be discussed with respect to FIG. 4B-C. Questions may inquire as to how a child customer responds to certain behavioral situations. For example, one question may read "I try to finish things when I start them" and prompt the customer to select "yes" "sometimes" or "no." Other questions may read "I share with people around me", "I have people I want to be like", "I feel I belong at my school", "I am treated fairly", "I talk to my family about how I feel", etc. Upon receiving responses to the question, the machine-learning algorithm analyzes the responses and assigns the child customers to clusters based on how the child customers respond to the questions. As seen in FIG. 4B, fourteen customer datasets are processed, and three clusters (Cluster 1, Cluster 2, and Cluster 3) are generated. The breakdown of responses for each cluster is illustrated in FIG. 4C. In this example, the child customers in cluster 1, responded (predominantly) "yes," but also sometimes "no" to the question "I talk to my family about how I feel" while the child customers in cluster 3 never responded "yes" and the child customers in cluster 2 respond (predominantly) "yes" but also "sometimes" or "no" in equal amounts. The clusters may be labeled with an identifier describing the behavioral traits of the child customers in that cluster. For example, the child customers in cluster 1 tend not to share or cooperate with others and do not have many people they want to be like. This cluster may be labeled "unsocial." The child customers in cluster 2 like to share but generally do not feel that they are treated fairly and, more often than not, do not participate in religious activities; thus, cluster 2 may be labeled "Unfair." The child customers in cluster 3 tend to not talk to their families about their feelings and tend to harm themselves or others; thus, this cluster may be labeled "Hurt."

Using the assigned cluster, the computing device may generate a list including at least one service provider who specializes in treating customers having the behavior trait associated with the cluster. The list may be transmitted to the customer device. The questions and responses corresponding to the assigned cluster, i.e., those questions and responses that caused the customer to be assigned to the cluster, may be transmitted to the service provider and/or customer. In this way the service provider may know which questions and responses may be particularly useful to consider or discuss upon seeing/treating the customer.

In some embodiments of this disclosure, the platform may store and update responses to create a more intuitive platform. A list of services providers and customer clusters may be stored in one or more network-based non-transitory storage devices, such as a server or other computing device. Customers provided identifying information, such as the responses discussed and described above, may be stored in a repository in the one or more non-transitory storage devices in a standardized format. The information may be submitted remotely over a network through a graphical user interface of a customer device. The customer-provided responses may be analyzed using one or more of the machine learning algorithms discussed above. For example, the information may be processed using a clustering algorithm to match the customer to at least one of the clusters or the information may be processed using a Naïve Bayes-algorithm to determine a customer need, as discussed above. Alternatively, both algorithms may be executed simultaneously or successively on the information. For example, a clustering algorithm may be executed to assign the customer to a cluster and a naïve bayes algorithm may be executed after the customer has been assigned, to determine a customer need or one or more customer risk-factors based on the responses corresponding to the assigned cluster. The database may be automatically updated to include each successive set of customer responses so that the algorithm continuously updates the clusters and/or needs based on the universe of customer responses provided. In this way, the platform is able to learn about its customers and provide increasingly useful service provide recommendations.

Figure 5:
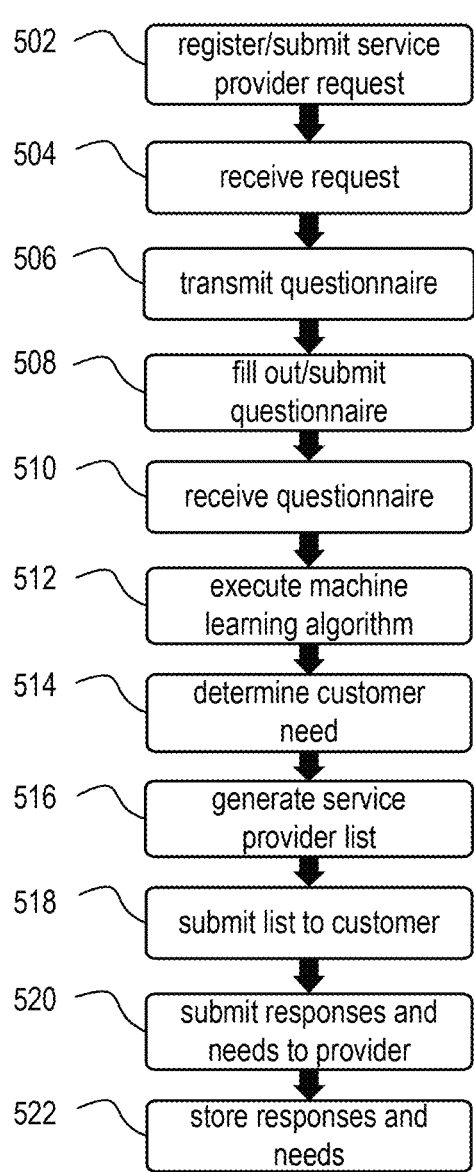
FIG. 5 is a flowchart illustrating an exemplary process in accordance with embodiments of this disclosure.

FIG. 5 describes an exemplary method of determining a customer need in accordance with embodiments of this disclosure.

At step 502, a customer 110a/110b submits a registration or service provider request using a customer device 112 over a network 114. The customer may be an individual seeking assistance on their own behalf or an individual or entity seeking assistance on another's (e.g., child, parent, patient) behalf. At step 504, computing device 116 receives the request and transmits a questionnaire to the customer device. The questionnaire may be embodied in a standard format such as questionnaire 200 illustrated in FIG. 2. Alternatively, the questionnaire may only contain questions relating to a specific category 202-208, or a combination of two or more categories. The questionnaire may also be acquired from an entity and uploaded into the platform for presentment to the customer. For example, the questionnaire may be similar to the intake form a particular treatment facility or social services group, or be modeled after another assessment form, e.g., Adverse Childhood Experience (ACE) questionnaire. At step 506, the computing device transmits the questionnaire over the network to the customer device. In accordance with some embodiments, steps 502-506 may be optional. For example, the questionnaire may be available on, e.g., an interface of the device 112 and completed without submitting a request. The questionnaire may be filled out and uploaded into the platform and submitted at step 508. Computing device 116 may receive the responses to the questionnaire at step 510 and execute a machine-learning algorithm at step 510.

The algorithm may be a clustering algorithm and/or predictive algorithm as discussed above. For example, a K-means clustering algorithm may be executed on the responses to assign the customer to at least one cluster. The cluster may be used to assess the customer's needs and match the customer with a service provider at step 514. Alternatively, a Naïve Bayes-algorithm may be executed on the responses to generate a list of critical questions and determine the customer's need(s). Alternatively, both algorithms may be executed simultaneously or successively on the information. For example, the clustering algorithm may be executed on the responses to assign the customer to a cluster and a naïve bayes algorithm may be executed after the customer has been assigned, to determine a customer need or one or more customer risk-factors based on the responses corresponding to the assigned cluster. A regression algorithm may also be executed determine a likelihood that the customer will benefit from having his/her needs treated/met by a service provider.

At step 516, the computing device 116 may generate a list of one or more service providers for treating/meeting the customer's need(s). The list may be transmitted to the customer device at step 518 and the list of critical questions, responses and need(s) may be transmitted over the network to the customer device and/or service provider at step 520. All responses and needs may be stored in a database of the computing device 116. Steps 512-522 may be repeated for each set of responses received. Once the customer is successfully registered with the platform, the customer may receive an account login or other credentials. The customer may visit his/her platform account to track matches, update responses to the questionnaire, or provide feedback for services received.

Figure 6:
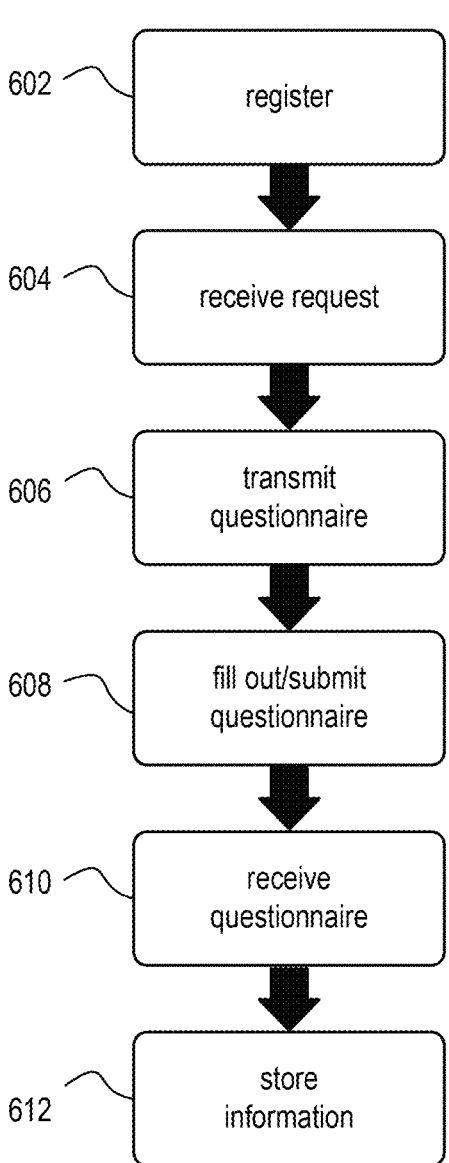
FIG. 6 is flowchart illustrating an exemplary process in accordance with embodiments of this disclosure.

FIG. 6 illustrates a method of building a service provider network. Steps 602-610 are substantially similar to steps 502-510 above except for the contents of the questionnaire.

Figure 7:
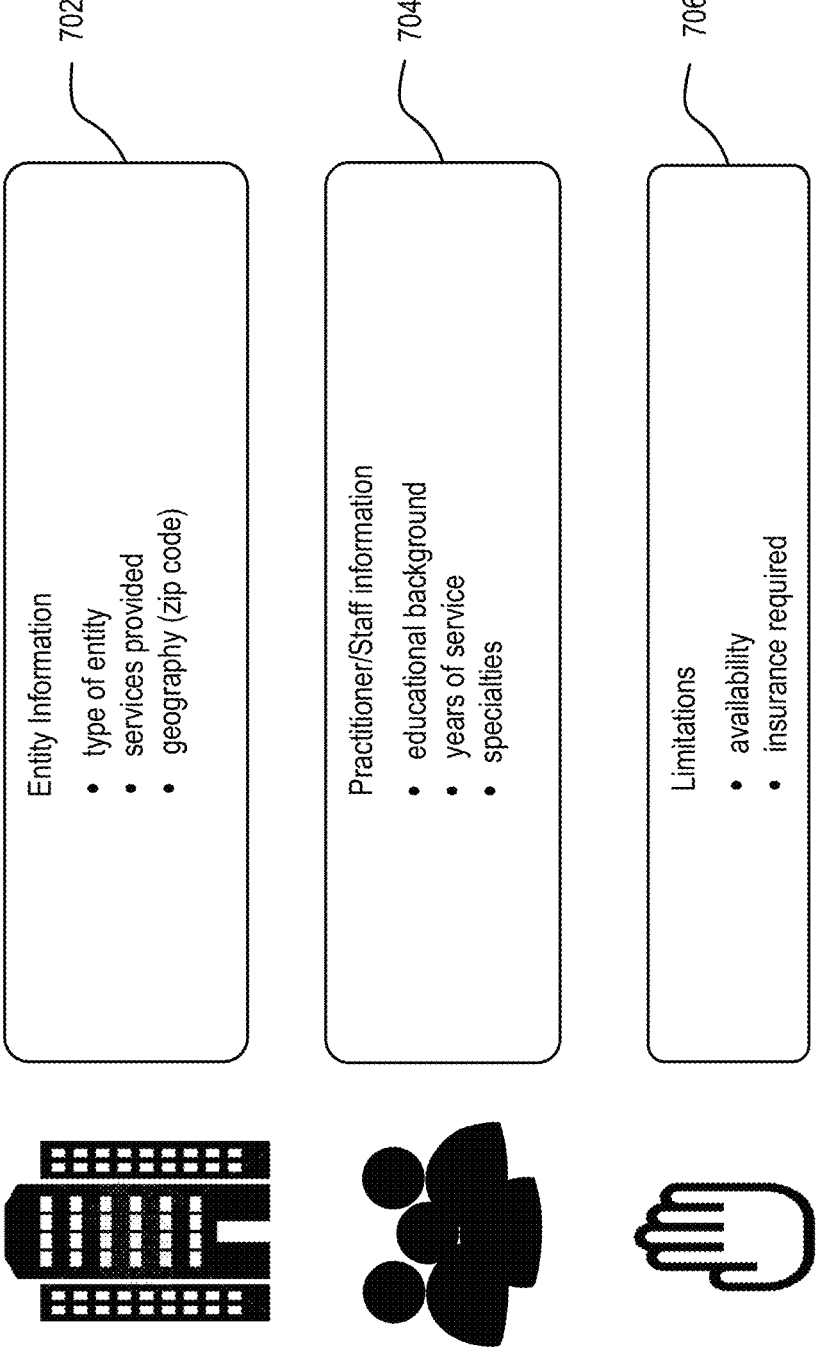
FIG. 7 is an illustration of an exemplary questionnaire in accordance with embodiments of this disclosure.

Here, the questionnaire may be crafted to identify the types of services the provider can provide and whether there are any limitations to that service. The questionnaire may be modeled after exemplary questionnaire 700, illustrated in FIG. 7. Questionnaire 700 may include subsections 702-706. Subsection 702 may prompt the customer for entity information such as entity type, services provided, or zip code. The entity type may be selected from a list of options, e.g., social worker, allergist, physical therapist, shelter, doctor, etc., or may be typed into a field. The services provided may be selected from a list of options corresponding to the entity type or provider, or typed into a field. Alternatively, the provider may link a webpage to the provider's website and the platform may determine the services provided based on the link. Subsection 704 may prompt the provider for information relating to the provider's staff or practitioners. For example, the provider may list the staff member's educational background (e.g., Doctor of Dental Surgery-DDS), time of service (e.g., 8 year) and specialties (e.g. braces and orthodontics). Alternatively, the provider may upload a link to the staff member's webpage biography and the platform may determine the aforementioned credentials based on the text of the biography. Subsection 706 may prompt the customer for entity limitations. For example, subsection 706 may inquire as to the entity's next available appointment and whether insurance is required. If insurance is required, subsection 706 may further inquire as to the type of insurance needed. In some embodiments, the system automatically customizes the questions based on the system's analysis of the provider's responses to previously answered questions. The questions may get smarter with each question answered thereby streamlining the questionnaire process. For example, if the provider indicates they are a dentist, the selectable option under "services provided" may be limited to relevant dental services, e.g., prosthodontics, oral surgery, braces, etc.

The questionnaire responses may be submitted to computing device 116 at 610 and stored at step 612. Once the provider is successfully registered with the platform, the provider may visit his/her platform account to track matches and service requests, update questionnaire responses, and/or request to be removed from the provider network.

Alternatively, a provider may be added to the network while the provider is requesting services on another's behalf. For example, if the customer of FIG. 5 is a business or other entity, the questionnaire may ask the customer if it would like to provide services to other customers associated with the platform. For example, the questionnaire may ask a pediatrician completing the questionnaire on behalf of a patient whether the pediatrician would like his services and/or practice to be added to the platform's network of healthcare providers. If the provider agrees to be listed, the computing device may store the provider's demographic information in a database. In this way, the platform may compile a database of confirmed platform affiliates, that may be recommended to other customers.

Figure 8:
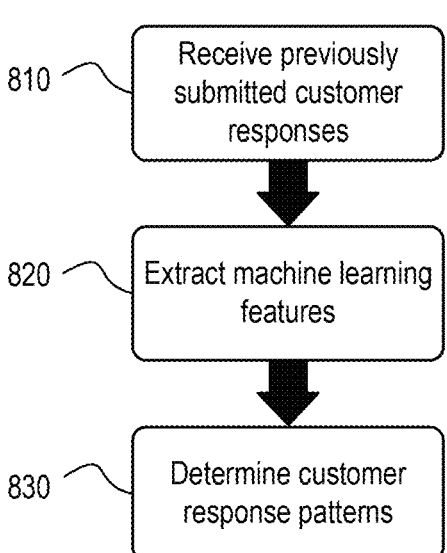
FIG. 8 is a flowchart illustrating an exemplary process in accordance with embodiments of this disclosure.

Referring now to FIG. 8 in some embodiments, the system may train the machine-learning algorithm using customer questions and responses. In this way, each iteration of questions and responses may cause the clusters and/or critical questions to be automatically updated so that the platform becomes smarter with each customer submission. For example, at step 810 of process 800, system 100 may train a machine learning model using information on previously submitted customer responses. In some embodiments, the information on previously submitted responses includes information on customer behavioral, health, or socio-economic responses. At step 820, system 100 may be configured to extract machine learning features from the customer responses. In some embodiments, these features can be extracted by inputting previously obtained customer responses into a first convolutional neural network. The first convolutional neural network can be configured to output the machine learning features. System 100 can extract customer response patterns from the machine learning features. In some embodiments, these features can be extracted by inputting the machine learning features into a classifier, such as a second convolutional neural network. In some embodiments, the second convolutional neural network can be distinct from the first convolutional neural network. The second convolutional neural network can be configured to output indications of the response patterns. At step 830, system 100 can be configured to determine a user need or a data point for a user profile based on the extracted machine learning features. For example, system may be configured to determine the user's behavioral, health, or socio-economic needs based on the machine-learning model, and store the determined needs as part of a profile on the user's account.

Although system 100 is described as being used to determine customer health and behavioral needs, as explained previously, this is only exemplary. In general, the systems and methods of the current disclosure may be used to assess any of a variety of needs predicated on the suer's socio-economic status, health, behavior, environment, etc. While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A system for using machine learning-based relationship association to assess a user need, the system comprising:
   at least one processor; and
   a storage medium storing instructions that, when executed, configure the at least one processor to perform operations comprising:
   receiving from a user device one of an electronic service request or registration request;
   transmitting to the user device for display on a user interface, over a communication network, a questionnaire with at least a first and second question in response to the request of the user;
   receiving responses to the first and second questions from the user device over the network;
   generating a relationship map between the first and second questions based on the received responses;
   determining, using a machine-learning algorithm, a relationship between the first and second questions based on the received responses;
   assigning to the first and second questions, using the machine-learning algorithm, a relationship value between 0 and 1 based on the determined relationship, wherein the relationship value represents a likelihood the response to the first question is associated with the response to the second question;
   determining, using the machine-learning algorithm, one of the first or second question has a relationship value greater than 0.5;
   designating, using the machine-learning algorithm, the first or second question as a critical question when the relationship value is greater than 0.5;
   determining, using the machine-learning algorithm, a need of the user based on the response of the user to the critical question;
   accessing a database to generate a list of service providers based on the determined need of the user; and providing the list of service providers to the user device for display on the user interface.

2. The system of claim 1, wherein the critical question is a critical behavioral question.

3. The system of claim 2, wherein the operations further comprise:

determining a behavioral need associated with the response of the user to the critical behavioral question.

4. The system of claim 2, wherein the operations further comprise:

generating a list of one or more critical behavioral questions, transmitting the generated list of critical behavioral questions to at least one service provider for treating the behavioral need.

5. The system of claim 1, wherein the operations further comprise:

storing the number of critical responses received from the user device in the database.

6. The system of claim 1, wherein the operations further comprise:

determining a location of the user device based on a signal transmitted from the user device.

7. The system of claim 6, wherein the operations further comprise using the determined location to generate the list of service providers.

8. The system of claim 1, wherein the operations further comprise:

determining, using the machine-learning algorithm, based on the response of the user to the critical question, a likelihood that the user will benefit from receiving services of a service provider from the list of service providers.

9. The system of claim 1, wherein the operations further include training the machine learning algorithm using the user responses.

10. The system of claim 1, wherein the critical question has a relationship value greater than 0.7.

11. The system of claim 1, wherein the operations further comprise using a response to the questionnaire to automatically customize another question of the questionnaire.

12. The system of claim 1, wherein:

the determining the need of the user based on the response of the user to the critical question is performed based on the designation of the critical question.

13. The system of claim 1, further comprising:

transmitting the critical question upon the designation as a critical question, or storing the critical question upon the designation as a critical question.

14. The system of claim 1, wherein the relationship map indicates how a response to the first question is predictive of a response to the second question.

15. The system of claim 14, wherein the relationship map further indicates how a response to the first question is predictive of a response to a third question and how a response to the second question is predictive of a response to the third question.

16. The system of claim 1, wherein determining the relationship between the first and second questions is based on the generated relationship map.

17. The system of claim 1, wherein, upon designating one or more questions as critical questions, the system determines the user's need based on the responses to the critical questions without presenting or requiring responses to additional questions of the questionnaire.

\* \* \* \* \*